United States Patent [19]
Malecki et al.

[11] Patent Number: 5,878,841
[45] Date of Patent: Mar. 9, 1999

[54] JOINT DEVICE FOR A LUBRICATION SYSTEM AND A PUMP APPARATUS INCLUDING THE JOINT DEVICE

[75] Inventors: Krzysztof Malecki; Waldemar Szymanski, both of Tullinge, Sweden

[73] Assignee: Alfa Laval Agri AB, Tumba, Sweden

[21] Appl. No.: 860,134

[22] PCT Filed: Nov. 22, 1995

[86] PCT No.: PCT/SE95/01572

§ 371 Date: Sep. 8, 1997

§ 102(e) Date: Sep. 8, 1997

[87] PCT Pub. No.: WO96/20367

PCT Pub. Date: Jul. 4, 1996

[30] Foreign Application Priority Data

Dec. 28, 1994 [SE] Sweden ............................ 9404544-0

[51] Int. Cl.[6] ............................ F01M 9/08; F01M 11/08; F16N 7/10; F16N 25/00
[52] U.S. Cl. ...................... 184/6.23; 184/6.24; 184/27.1; 184/31; 184/58; 95/262; 96/204; 96/219; 96/220
[58] Field of Search .................. 184/6.23, 6.24, 184/26, 27.1, 27.3, 31, 58, 59, 105.1; 95/260, 262; 96/204, 214, 220

[56] References Cited

U.S. PATENT DOCUMENTS

| 67,837 | 7/1867 | Joerger . |
| 138,436 | 4/1873 | Regan . |
| 385,951 | 11/1888 | Szymanski et al. . |
| 2,925,883 | 2/1960 | Everett . |
| 3,143,188 | 8/1964 | Normandin . |
| 3,638,760 | 2/1972 | Lamm .................................. 184/6.23 |
| 3,749,074 | 7/1973 | Lamm .................................. 184/6.23 |
| 5,004,074 | 4/1991 | Jewess ............................... 184/105.1 |

FOREIGN PATENT DOCUMENTS

| 2559843 | 8/1985 | France . |
| 2732474 | 5/1979 | Germany . |
| 3711000 | 10/1988 | Germany . |
| 2529842 | 1/1976 | Sweden . |
| 454198 | 4/1988 | Sweden . |

*Primary Examiner*—Christopher Verdier
*Attorney, Agent, or Firm*—Hovey, Williams, Timmons & Collins

[57] ABSTRACT

A pump apparatus for a milking machine is provided with an oil container for the supply of lubricant to the pump. A joint device is inserted in the container. The joint device comprises a casing enclosing an inlet conduit for bringing back oil to the container and an outlet conduit for the removal of oil from the container and supply to the pump.

12 Claims, 5 Drawing Sheets

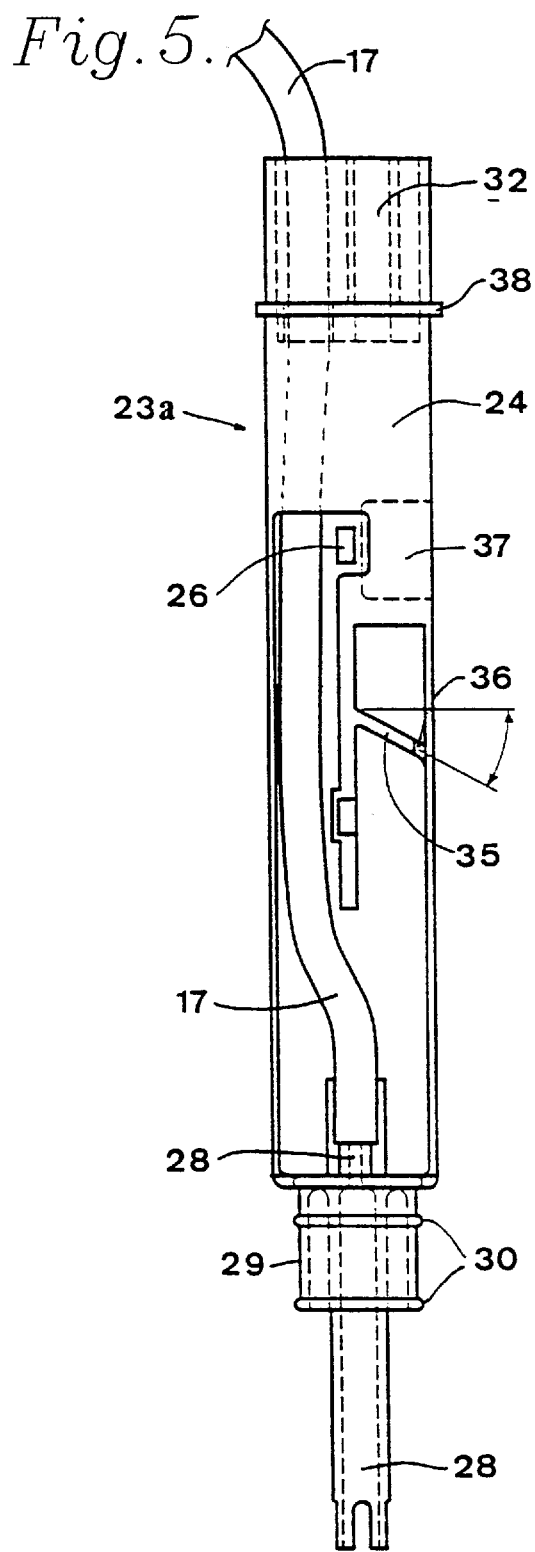
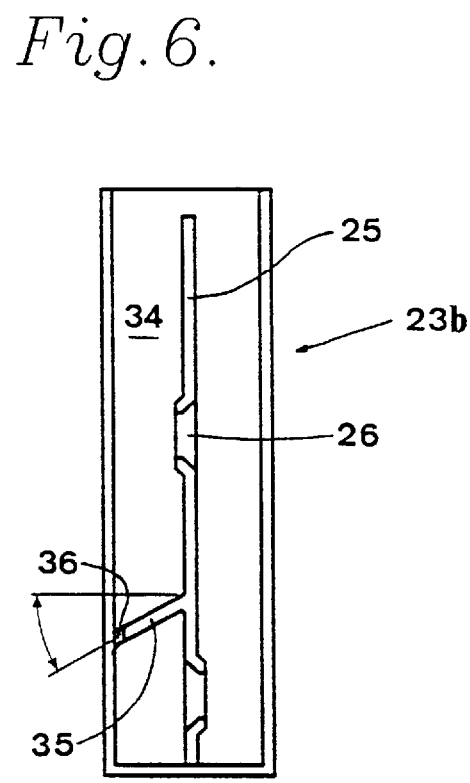
Fig. 5.
Fig. 6.

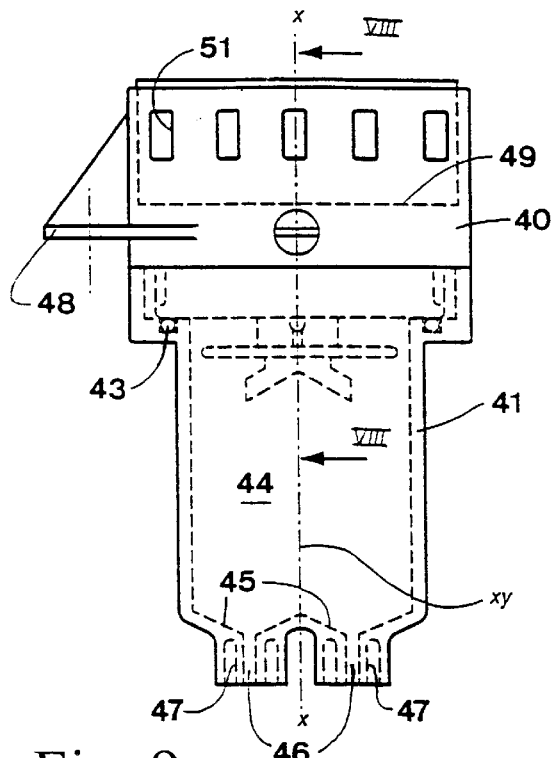
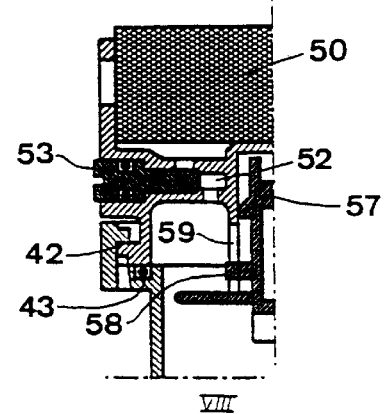
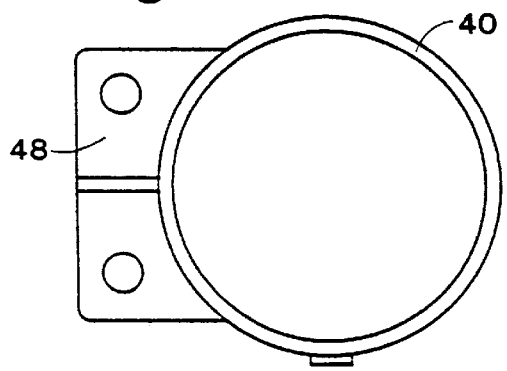
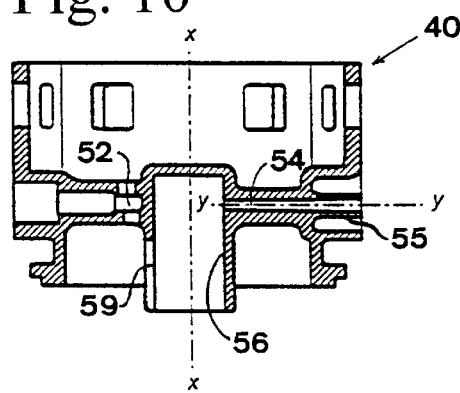
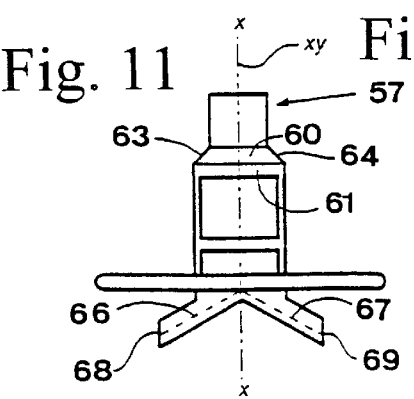
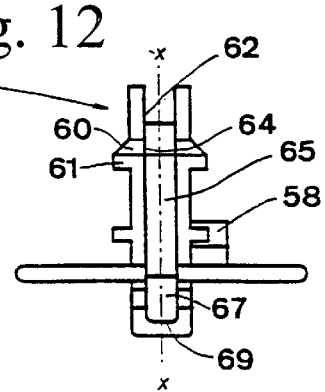

JOINT DEVICE FOR A LUBRICATION SYSTEM AND A PUMP APPARATUS INCLUDING THE JOINT DEVICE

BACKGROUND OF THE INVENTION

1. Field of the Invention

The present invention relates to a joint device for a lubricating system that is inserted into a container with a lubricant, such as oil, and that is also comprised of a casing that encloses an outlet conduit for the removal of the lubricant from the container. Moreover, the invention relates to a pump apparatus for producing a subpressure in a milking machine. The pump apparatus includes a pump having a suction side, a pressure side, and a lubrication device for lubricating the pump apparatus.

2. Description of the Prior Art

Today, milking machines operated by vacuum pumps are used in barns. In order to guarantee a high level of uniform milk production and ensure the health of the animals, the pumps must work in a highly reliable manner. Lubrication of the pump and especially its bearings is very important in achieving such reliability.

A usual type of pump device used today is shown in FIG. 1 labeled "Prior Art." The pump device includes a vacuum pump 1 having a suction side 2, a pressure side 3, and terminating in an outlet tube 4. A lubricator 5 comprised of an oil container 6 and an oil distributor (not shown) delivers oil to the bearings of vacuum pump 1. With the aid of the oil distributor (not shown), it is possible to guide the oil flow to the bearings of vacuum pump 1 via oil conduits 7. A silencer 8 and an oil trap 9 are provided on the pressure side 3 of vacuum pump 1. Both silencer 8 and oil trap 9 separate the oil which is then carried by air on pressure side 3 to oil containers 6a and 6b. Several problems are associated with this known pump device. First, container 6 on lubricator 5 must be filled with new oil before it empties in order to prevent jamming of the bearings. Therefore, continuous supervision of the oil level in container 6 is necessary. Oil containers 6a and 6b are connected to oil trap 9 and silencer 8. Oil containers 6a and 6b collect the separated oil and must be continuously supervised in order to prevent oil flowing onto the floor. The oil flow through lubricator 5 is controlled by a valve that directly influences the oil flow by throttling or opening a passage through which the oil flows. The amount of oil delivered in this manner through the valve is very difficult to regulate in an accurate manner. Furthermore, the outlets are sensitive to particles of dirt or thickened accumulations of oil that can stop up the outlets. Because the oil flow from lubricator 5 may not be observed, it is difficult to determine how much oil has been delivered to vacuum pump 1. Oil consumption increases if, for example, any one of the shaft bearings of the vacuum pump is leaking oil. Since this increase of oil consumption may not be observed, such a leakage may lead to the breakdown of the bearings. Furthermore, the function of lubricator 5 is very sensitive to a small inclination which results in an unequal distribution of oil to oil conduits 7 and to the different pump bearings. Moreover, lubricator 5 demonstrates an open construction that gives rise to a risk of accumulation of dirt in the oil. Consequently, the bearings may be supplied with impurities. In addition, the handling of the known lubricating system is relatively complicated. The new container 6 with new oil must be replaced in lubricator 5 when the oil in old container 6 runs out. Moreover, containers 6a and 6b must be replaced regularly because separated oil is collected therein.

German Patent No. 3711000 discloses an oil container for combustion engines with dry sump lubrication. In order to reduce noise, this oil container includes a return conduit having an orifice in a conical pipe. Thus, the mixture of oil and air that is brought back to the oil container may expand in the pipe with the oil depositing on the wall of the pipe by means of a helicoidal movement. The oil to be transported from the container is sucked out through a separate pipe in the lower portion of the container.

French Patent No. 2599843 discloses a device for the refining of oil. The device is comprised of a container having an inlet conduit leading to a first chamber with a sloping bottom wall. Impurities are collected in a lower space and oil is sucked out via an outlet conduit from a second chamber by means of a pump.

German Patent No. 2732474 discloses an oil suction socket for a lubricating system that is intended to be inserted into a container with oil. The suction socket includes an opening provided in the lower portion of the casing that is otherwise closed.

Swedish Patent No. 454 198 discloses a lubricant container attached to an engine. Within the lubricant container, there is a second smaller container which encloses an outlet conduit for the removal of lubricant from the lubricant container and an inlet conduit for the supply of lubricant to the lubricant container. The second smaller container is not inserted into the lubricant container, but is an integral, fixed part of the lubricant container. SE-B-454 198 does not suggest any means for separating air from the lubricant supplied to the lubricant container.

Swedish Patent No. 2 529 842 discloses a lubricating system having a pump device immersed in a lubricant container. The pump device includes an outlet means for the removal of lubricant to a machine to be lubricated. Lubricant is supplied to the lubricant container by means of further conduits separated from the pump device.

SUMMARY OF THE INVENTION

The object of the present invention is to overcome the problems discussed above. In particular, the present invention is aimed toward simplified handling and reduced supervision of the lubricating system.

This object is obtained by a joint device characterized by a casing that encloses an inlet part for the supply of lubricant to the container. The inlet part includes a separation means for separating air from the lubricant supplied. Furthermore, the object of the invention is obtained by a pump apparatus characterized by a lubrication device including a lubricant container and a joint device insertable therein. The joint device is also comprised of a casing that encloses an outlet means for the removal of lubricant from the lubricant container and an inlet means for returning used lubricant to the lubricant container. The inlet means also includes means for separating air from the lubricant supplied.

Thus, by means of the present invention, all used lubricant may be returned to a container, which is a type commonly available in the marketplace. In this manner, the handling of the lubricating system is significantly facilitated in that only the container need be replaced. Furthermore, troublesome lubricant overflow may be avoided in that the container may be appropriately located and disposed of in a suitable position. Because the lubricant is circulated through the lubricating system, the risk of running out of lubricant and thereby damaging the apparatus to be lubricated is substantially eliminated so that continuous supervision is unnecessary. By this separation means, it is ensured that all lubricant that has been returned also remains in the container.

Preferably, the separation means may be positioned in an upper portion of the joint device so that the upper portion and separation means will be located above the lubricant level. Thus, the separation means will always operate with maximum effect. In a preferred embodiment of the present invention, the separation means comprises an expansion chamber. According to another embodiment of the present invention, the expansion chamber may be comprised of a sloping wall which positively increases the efficiency of the expansion chamber.

Due to the provision of a lubricant filter positioned on the joint device, the replacement of the oil container at specific points in time is no longer critical. By providing the joint device with an elongated shape and with a projection on the outer side of the casing, the joint device may easily be inserted in a common lubricant container.

BRIEF DESCRIPTION OF THE DRAWINGS

The present invention will now be explained in more detail with reference to different embodiments by way of example only and with reference to the following figures:

The prior art figure is a side elevational view of a pump apparatus in accordance with the prior art;

FIG. 5 is a front elevational view in partial section and partial phantom of the joint device of FIG. 3 in accordance with the present invention;

FIG. 6 is a front elevational view of a part of the joint device of FIG. 5;

FIG. 7 is a side elevational view in partial phantom of the distribution device of the pump apparatus of FIG. 2;

FIG. 8 is a sectional view taken along line VIII—VIII of FIG. 7;

FIG. 9 is a plan view of the distribution device of FIG. 7;

FIG. 10 is a sectional view taken along line x—x of FIG. 7;

FIG. 11 is a side elevational view of the distributor of the distribution device of FIG. 7; and FIG. 12 is another elevational view of the distributor of the distribution device of FIG. 7.

DETAILED DESCRIPTION OF THE PREFERRED EMBODIMENT

Figure 1:
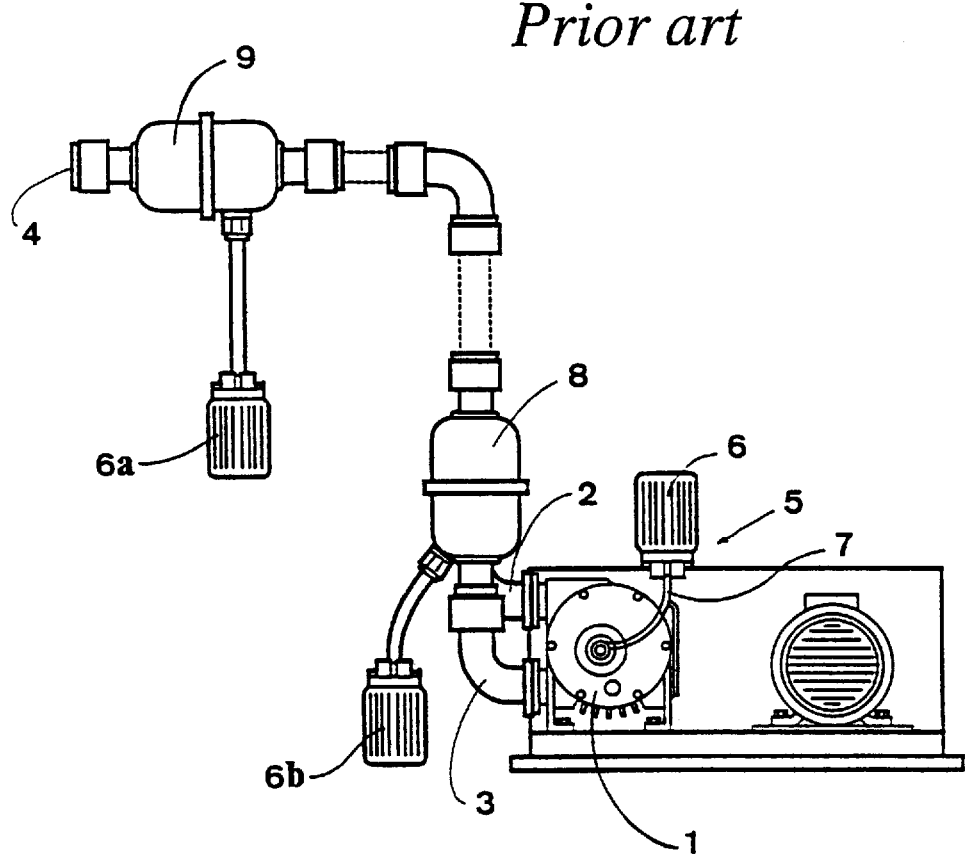
FIG. 1 is a side elevational view of a pump apparatus in accordance with the prior art.
Figure 2:
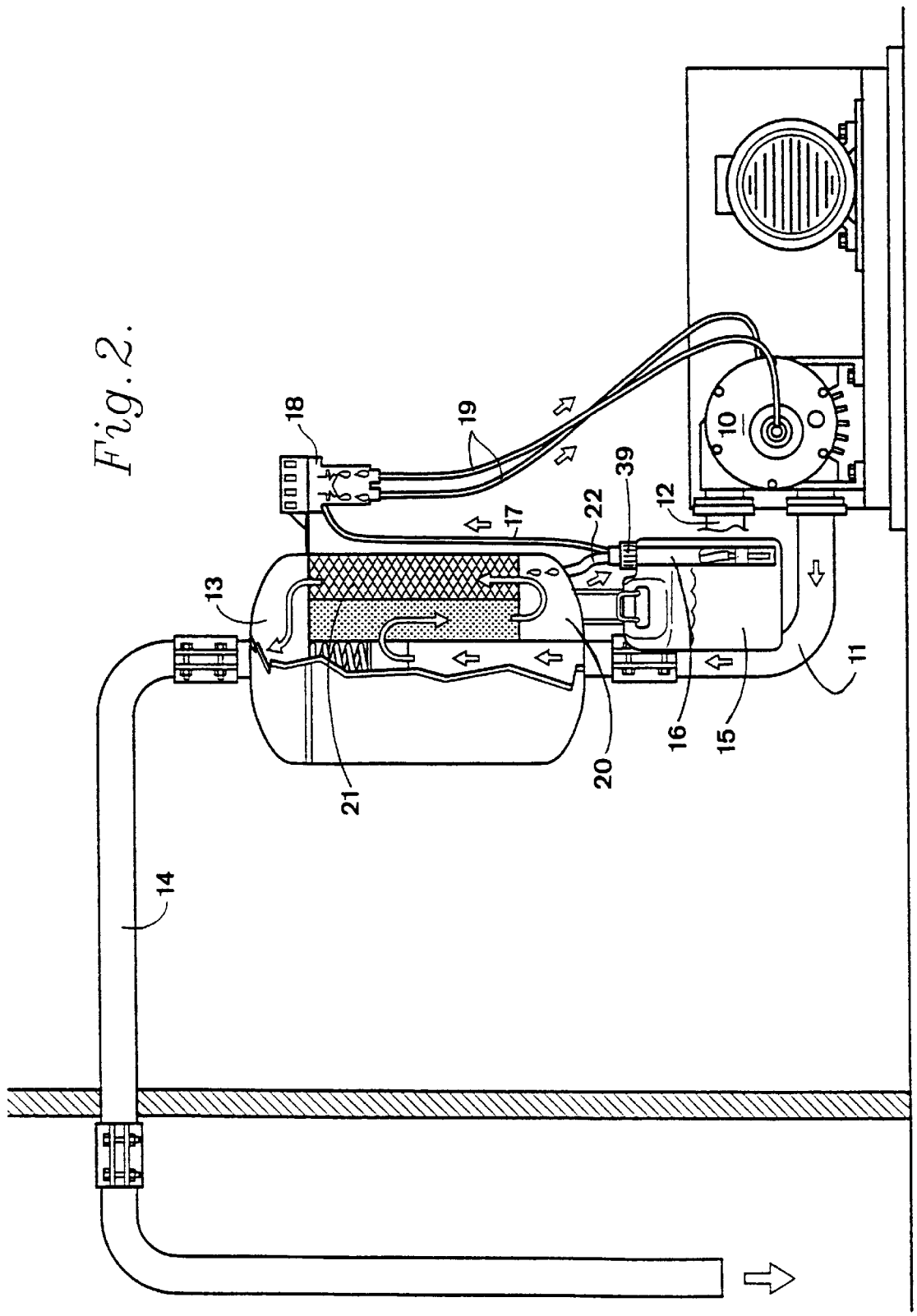
FIG. 2 is an elevational view in partial section of the preferred pump apparatus in accordance with the present invention with the outlet conduit thereof shown extending through a wall.
Figure 3:
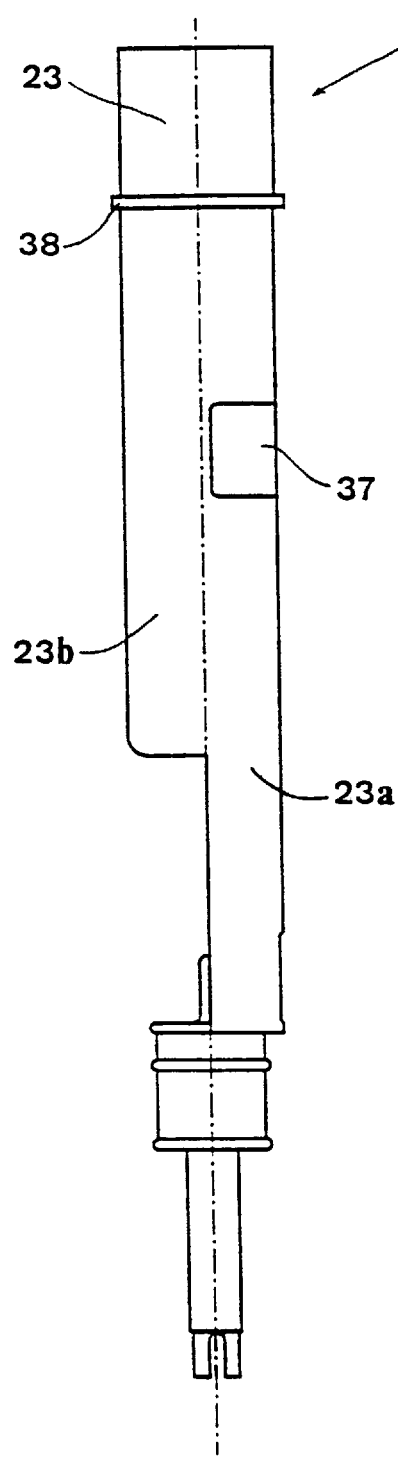
FIG. 3 is a side elevational view of the preferred joint device of the pump apparatus of FIG. 2 in accordance with the present invention.
Figure 4:
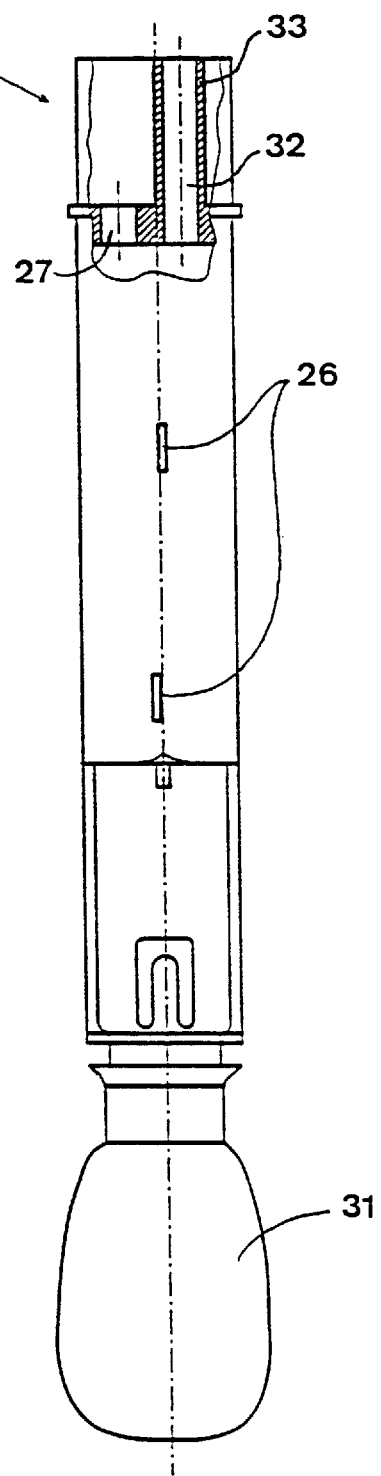
FIG. 4 is a front elevational view in partial section of the preferred joint device as shown in FIG. 3 in accordance with the present invention.

Turning to the figures, FIG. 2 shows a pump apparatus in accordance with the present invention comprising a pump 10 having a pressure side 11 and a suction side 12. On pressure side 11 of pump 10 there is a combined silencer and oil separator 13. An outlet conduit 14 leads from oil separator 13 through a wall. Pump 10 is preferably driven by an electric motor provided with two shaft bearings. In order to ensure the function of pump 10, these bearings must be continuously supplied with lubricant. To this end, the pump apparatus comprises an oil container 15 which may be a common plastic can available in the market. A joint device 16 is inserted into oil container 15. From joint device 16, an oil conduit 17 leads to a distribution device 18. The incoming oil is separated in distribution device 18. In the present embodiment, the incoming oil is separated into two outlet conduits 19 which convey the oil to the two bearings of pump 10.

The air, mixed with oil and forced out from pump 10 on pressure side 11 is fed to oil separator 13. The air is conveyed in an upward and downward movement therein such that it may expand in expansion chamber 20. Oil, deposited on the walls of expansion chamber 20 and collected by filtering means 21 provided in expansion chamber 20, is transported via a discharge conduit 22 from the lowest part of oil separator 13 to oil container 15. Air and oil are then forced out through conduit 22 to container 15 because of overpressure in oil separator 13. The system air pressure may be equalized with atmospheric pressure at the opening of container 15. The bearings of pump 10 communicate with suction side 12 of pump 10 such that pump 10 will produce subpressure in oil conduits 19. Oil will be sucked from container 15 via conduit 17 to distribution device 18 and therefrom to the bearings of pump 10 via conduits 19.

Turning to FIGS. 3–6, joint device 16 includes a cylindrical casing 23 comprised of two parts 23a and 23b for reasons of manufacture. Part 23a comprises a middle portion having a semi-cylindrical shape. An intermediate partition 24 extends between parallel outer edges of the semi-cylindrical middle portion of Part 23a. Part 23b has a semi-cylindrical shape as well and comprises an inner partition 25 dividing the room into two sub-rooms of essentially equal size. In another preferred embodiment of the present invention, casing 23 is produced in a single part. The two parts 23a and 23b of casing 23 are, in the example disclosed, connected to one another by hook-shaped means 26. Other types of connecting means may also be used. Oil conduit 17 extends through an opening 27 in the upper portion of joint device 16, conduit 17 being connected to inlet channel 28 positioned in the lower portion of joint device 16. At the outer bottom surface of joint device 16, the orifice of inlet channel 28 is provided. Furthermore, joint device 16 is provided with a cylindrical envelope surface 29 extending around inlet channel 28 and comprising flanges 30 or similar projections for the attachment of an oil filter 31 such that oil filter 31 covers the orifice of inlet channel 28. An inlet means 32 is provided in the upper portion of joint device 16 and is comprised of a pipe socket 33 having conduit 22 attached thereto. Inlet means 32 extends to a separating means 24 and 34 for separation of oil from the oil/air mixture which is supplied via conduit 22. In the preferred embodiment, the orifice of inlet means 32 is positioned in expansion chamber 34 formed by casing 23, and, more specifically, by intermediate partition 24 of part 23a and one of the sub-rooms of part 23b. Expansion chamber 34 extends downward to a sloping wall 35 which may slope from 10–70 degrees and, more preferably, from 20–50 degrees with respect to the horizontal plane. In the lowest part of sloping wall 35, an opening 36 leading to container 15 is positioned. Expansion chamber 34 extends from sloping wall 35 backward and up on the opposite side of intermediate partition 24. As seen in FIG. 5, the expansion chamber 34 extends upwards behind intermediate partition 24. An opening 37, indicated in phantom in FIG. 5, is provided on the other side of intermediate partition 24 in the vertical outer wall of part 23a.

The mixture of air and oil conveyed through inlet means 32 via supply conduit 22 expands into expansion chamber 34 such that oil is deposited on the vertical walls and sloping wall 35 of expansion chamber 34. During the passage through expansion chamber 34, the mixture of air and oil is subjected to a change of direction. That is, the mixture changes from a downward movement to an upward one whereby the oil present in the air tends to continue in the first downward direction toward sloping wall 35 due to the forces of inertia and gravity. Thereafter, the air may be removed through opening 37, and the oil deposited on vertical walls and sloping wall 35 of expansion chamber 34 flows downward and through opening 36 and into oil container 15.

A flange 38 or the like is provided on the outside of casing 23 at the upper portion of joint device 16. Flange 38 rests against the edge of the opening of container 15 when joint device 16 is inserted into container 15. The opening of container 15 is provided with a socket having an external thread. By means of an attachment nut 39, as shown in FIG. 2, which may be threaded onto the threaded socket, joint device 16 may be fixed in container 15. Thus, joint device 16 is removably insertable in container 15 such that it is partly immersed in the lubricant within container 15. The opening of container 15 is provided on the top thereof and hence joint device 16 is inserted by a downward movement.

Turning to FIGS. 7–12, distribution device 18 is comprised of an upper cylindrical portion 40 and a lower cylindrical portion 41. In the preferred embodiment, portions 40 and 41 are connected together by means of a bayonet connection 42 and by means of a seal ring 43 which seals inner room 44 formed by portions 41 and 42 against the atmosphere. Distribution device 18 further comprises a longitudinal axis X—X being essentially vertical when distribution device 18 is in its normal operating position. Portion 41 is at least partially produced from transparent material. At the inner bottom surface of portion 41, two circular, conical recesses 45 are provided. Recesses 45 are terminated in their lowest part in a respective outlet channel 46 comprising a pipe socket 47 having an orifice on the lower side of portion 41. Each pipe socket 47 is connected to an oil conduit 19. The upper portion 40 is, on its outer side, provided with an attachment means 48 by which distribution device 18 may be fixed in its normal operating position, and, on its upper side, provided with a recess 49 in which an air filter 50 is disposed. The air may be introduced from above or through openings 51 in the envelope of the upper portion 40. The upper portion 40 comprises passage 52 through which atmospheric air may be sucked from recess 49 into inner room 44. The section area of passage 52 may be adjusted by means of an adjustment screw 53 provided in upper portion 40. When screw 53 is screwed outwardly, passage 52 is opened. When screw 53 is screwed inwardly, passage 52 is throttled. Furthermore, upper portion 40 includes inlet channel 54 which, by means of pipe socket 55, is connected to oil conduit 17 from joint device 16 and oil container 15. Inlet channel 54 has an orifice in a circular cylindrical cavity 56 which is provided on the underside of upper portion 40 and extends coaxially with longitudinal axis X—X. A distributor 57 is provided in cavity 56.

Distributor 57 may only be mounted in cavity 56 with a predetermined orientation due to pin 58 provided on a lower part of distributor 57 and slot 59 provided in cavity 56 to cooperate with pin 58. When distributor 57 is mounted in cavity 56, the orifice of inlet channel 54 is located opposite a peripheral surface 60 of distributor 57 which is upwardly tapering and extends almost 180 degrees. This surface is, in the preferred embodiment, conical, but it may also be convex or concave as seen in a plane parallel to the longitudinal axis X—X. Conical surface 60 has a central axis coaxial with longitudinal axis X—X and is symmetrically shaped with respect to a plan X-Y extending through a central axis Y—Y of inlet channel 54 and longitudinal axis X—X. Conical surface 60 is formed by a circular conical segment of distributor 57. The circular conical segment changes in a downward direction to a circular cylindrical segment comprising a cylindrical envelope surface 61 abutting the wall of circular cylindrical cavity 56. A circular conical segment and the circular cylindrical segment form parts of a plan surface 62 extending downwardly and parallel to the axis of cavity 56. The end edges 63 and 64 of conical surface 60 define the beginning of plan surface 62 such that an open gap 65 is formed and delimited by plan surface 62 and another limitation, as seen in FIG. 12, which is formed by a segment with an envelope surface abutting the diametrically opposite wall of cavity 56. Gap 65 extends downwardly to two sloping surfaces 66 and 67 which diverge downwardly away from one another. End edges 68 and 69 of surfaces 66 and 67 are disposed straight above a respective outlet channel 46 when distribution device 18 is vertically disposed.

Thus, the oil is sucked by the subpressure from pump 10 through inlet channel 54 and against conical surface 60. Because cylindrical envelope surface 61 abuts the wall of cavity 56, the oil may only be further transported by flowing into different directions in the flow channel formed by conical surface 60 and the wall of cavity 56. Hence, the flow channel will have a downwardly tapering shape, i.e., the sides of the channel are converging downwardly and are joined together at the bottom of the channel. It has now been found that, due to this particular shape, exactly the same amount of oil will flow in each direction independent of a slight inclination of distribution device 18. When the oil arrives at end edges 63 and 64 of conical surface 60, it will flow downwardly along plan surface 62 in two separate paths. The oil from end edge 63 will hit sloping surface 66 and the oil from end edge 64 will hit the other sloping surface 67. Due to the inclination of surfaces 66 and 67, the oil may only flow outwards and downwards and an increased separation effect of the oil paths is obtained. Sloping surfaces 66 and 67 end straight above a respective outlet channel 46. Due to conical recesses 45, the oil from sloping surface 66 will be transported through one of the outlet channels 46 and the oil from upper sloping surface 67 will flow through the other of the outlet channels 46 although distribution device 18 would incline slightly. Because end edges 68 and 69 are disposed at a relatively long distance from conical recess 45, the dripping frequency to the two bearings may be easily observed and adjusted by means of screw 53.

Although peripheral, upwardly tapering, conical surface 60, cylindrical envelope surface 61, and cavity 56 are all circular shaped in the preferred embodiment disclosed, they may also have other shapes, e.g., oval. Plan surface 62 may also be comprised of a non-plan shape, e.g., convex.

We claim:

1. A joint device for a lubricating system adapted for insertion in a container with lubricant, said joint device comprising: a casing enclosing an outlet conduit for the removal of lubricant from the container and enclosing an inlet part for the supply of lubricant to the container, and wherein the inlet part comprises a separation means for separating air from the lubricant supplied.

2. A joint device according to claim 1, including an upper portion and a lower portion and wherein the separation means is disposed in the upper portion.

3. A joint device according to claim 2, wherein the separation means comprises an expansion chamber.

4. A joint device according to claim 3, wherein the expansion chamber has a lower limit comprising a sloping wall.

5. A joint device according to claim 4, wherein the sloping wall has a lower portion in which an opening is provided.

6. A joint device according to claim 3, including an opening provided in the casing through which the expansion chamber communicates with the environment.

7. A joint device according to claim 1, wherein the outlet conduit comprises an outlet channel extending through the casing.

8. A joint device according to claim 7, including a filter, and wherein the outlet channel communicates with the interior of the channel via the filter.

9. A joint device according to claim 2 wherein the joint device has an elongated shape and comprises on its upper portion a projection provided on the outer side of the casing and formed such that the joint device may rest against an opening edge provided in the container when the joint device is inserted in the container.

10. A pump apparatus comprising:

a pump having a suction side and a pressure side; and a lubrication device for lubricating the pump, wherein the lubrication device comprises a lubricant container and a joint device insertable therein, the joint device comprises a casing which encloses an outlet means for the removal of lubricant from the lubricant container and an inlet means for bringing back used lubricant to the lubricant container, and wherein the inlet means comprises a separation means for separating air from the lubricant supplied.

11. A pump apparatus according to claim 10, including a further lubricant separator is provided on the pressure side of the pump, and wherein the inlet means of the joint device is connected to said further lubricant separator and provided to deliver lubricant separated to the lubricant container.

12. A joint device according to claim 10 wherein the pump is connected to the lubricant container via the outlet means of the joint device such that a subpressure produced by the pump is utilized to suck lubricant from the lubricant container via the outlet means of the joint device.

* * * * *

UNITED STATES PATENT AND TRADEMARK OFFICE
CERTIFICATE OF CORRECTION

PATENT NO : 5,878,841
DATED : March 9, 1999
INVENTOR(S) : Krzysztof Malecki; Waldemar Szymanski It is certified that error appears in the above-identified patent and that said Letters Patent is hereby corrected as shown below:

```
On the title page: Item [22]      identifying
the PCT Filing Date as "November 22, 1995" should read
- - December 22, 1995 - - .
```

Signed and Sealed this

Fourteenth Day of September, 1999

Attest:

Q. TODD DICKINSON

*Attesting Officer*    Acting Commissioner of Patents and Trademarks